US008904236B2

(12) United States Patent
Ben-Yehuda et al.

(10) Patent No.: US 8,904,236 B2
(45) Date of Patent: Dec. 2, 2014

(54) HIGH QUALITY LOGIC VERIFICATION STRESS TEST GENERATION USING TWO-STAGE RANDOMIZATION

(75) Inventors: Shimon Ben-Yehuda, Haifa (IL); Eli Bokshtein, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/354,098

(22) Filed: Jan. 19, 2012

(65) Prior Publication Data

US 2013/0191687 A1 Jul. 25, 2013

(51) Int. Cl.
*G06F 11/00* (2006.01)

(52) U.S. Cl.
USPC ............................................. 714/32; 714/25

(58) Field of Classification Search
USPC ...................... 714/38.1, 25, 36, 46
See application file for complete search history.

(56) References Cited

U.S. PATENT DOCUMENTS

| 7,600,169 | B2 | 10/2009 | Weller |
| 7,865,792 | B2 | 1/2011 | Lin et al. |
| 7,900,111 | B1 | 3/2011 | Kim et al. |
| 2006/0031718 | A1* | 2/2006 | Thornhill et al. ............... 714/38 |
| 2006/0129892 | A1 | 6/2006 | Diaconu et al. |
| 2011/0145643 | A1* | 6/2011 | Kumar et al. .................... 714/33 |
| 2011/0246834 | A1* | 10/2011 | Rajashekara et al. ......... 714/38.1 |

OTHER PUBLICATIONS

Jacek Czerwonka, "Pairwise Testing in Real World: Practical Extensions to Test Case Scenarios", 24th, Pacific Northwest Software Quality Conference, Microsoft Corporation, 2006.

* cited by examiner

*Primary Examiner* — Sarai Butler
(74) *Attorney, Agent, or Firm* — International IP Law Group, PLLC (57) ABSTRACT

A novel and useful stress test generation mechanism that is operative to divide the task of generating test case programs (files) into a first randomization stage and a second randomization stage. The first randomization stage selects the scenario and the second randomization stage generates a test case in accordance with the chosen scenario. In other words, during stage 1, a test scenario (i.e. value-categories) is randomly determined (using the weights assigned to the value-categories within each scenario-dimension). In stage 2, a test is randomly generated for the chosen scenario. Thus, for each scenario-dimension, one or more values are generated randomly for the chosen value-category. Once the values for the value-categories are generated, an output test file for use by the logic verification is generated.

22 Claims, 4 Drawing Sheets

HIGH QUALITY LOGIC VERIFICATION STRESS TEST GENERATION USING TWO-STAGE RANDOMIZATION

FIELD OF THE INVENTION

The present invention relates to the field of logic verification, and more particularly relates to a method and system for generating high quality logic verification stress tests using two-stage randomization.

SUMMARY OF THE INVENTION

There is thus provided in accordance with the invention, a method of generating stress tests for logic verification, said method comprising randomly selecting a category for each dimension in an input template, and randomly generating one or more values for each selected category.

There is also provided in accordance with the invention, a method of generating a stress test for logic verification, said method comprising randomly selecting a value-category for each scenario-dimension, obtaining one or more parameter files, each parameter file incorporating a selected value-category, and generating one or more random values for each value-category in accordance with its corresponding parameter file.

There is further provided in accordance with the invention, a method of generating a stress test for logic verification, said method comprising receiving a plurality of parameter file, weighting, in accordance with desired weights, said plurality of parameter files corresponding to the value-categories of each scenario-dimension, selecting one of said plurality of parameter files for each scenario-dimension, generating a random value for each value-category in accordance with its corresponding test file.

There is also provided in accordance with the invention, an apparatus for generating a stress test for logic verification, comprising a receiver unit operative to receive value-category definitions for each scenario-dimension, a first randomization stage operative to select a value-category randomly for each scenario-dimension, and a second randomization stage operative to generate a value randomly for each value-category.

There is further provided in accordance with the invention, a method of generating a stress test for logic verification, said method comprising writing a list of scenarios to a file, each scenario having a weight associated with it, in a first randomization stage, selecting a weighted scenario from said list, and applying said selected scenario to a second randomization stage.

BRIEF DESCRIPTION OF THE DRAWINGS

The invention is herein described, by way of example only, with reference to the accompanying drawings, wherein.

DETAILED DESCRIPTION OF THE INVENTION

The present invention is a stress test generation mechanism that is operative to divide the task of generating test case programs (files) into a first randomization stage and a second randomization stage. The first randomization stage generates the scenario and the second randomization stage generates a test case in accordance with the chosen scenario.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
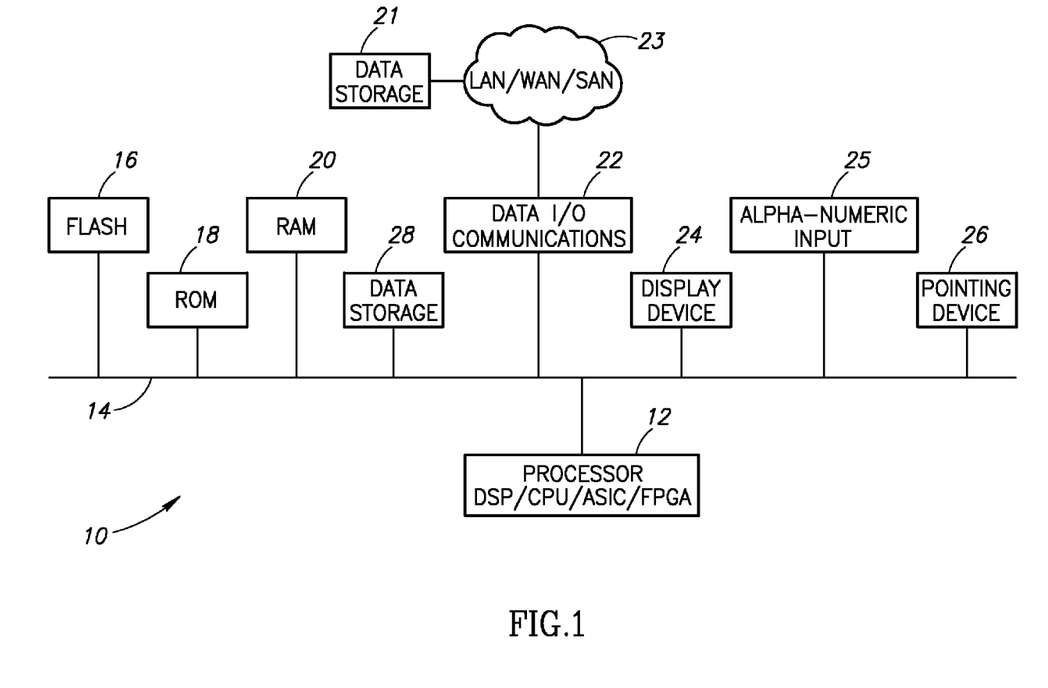
FIG. 1 is a block diagram illustrating an example computer processing system adapted to implement the test generation mechanism of an embodiment of the present invention.

A block diagram illustrating an example computer processing system adapted to implement the compression acceleration mechanism of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Logic Verification Stress Test Generation Using Two-Stage Randomization

A test case (or test case file) is a set of conditions or parameters (variables) under which a tester (hardware or software) determines whether a hardware device (e.g., logic or circuit design), software application or system or is working correctly or not. It may take numerous test cases to determine that a logic design or software program is considered sufficiently scrutinized to pass. Note that test cases are often referred to as test scripts.

Functional verification is widely acknowledged as the bottleneck of a hardware design cycle. Simulation is the main functional verification vehicle for large and complex designs and, therefore, stimuli generation plays a central role in this field. The generated stimuli, usually in the form of test cases, are designed to trigger architecture and micro-architecture events defined by a verification plan.

Simulation, however, is significantly slower than running real hardware. Thus, generated test cases must meet two inherent classes of requirements: (1) test cases must be valid, i.e. their behavior should be well defined by the specification of the verified system; and (2) test cases should also be of high quality, in the sense that they expand the coverage of the verified system and focus on potential bugs and design flaws.

The input for a test case generator is a specification of a test template. This input usually takes the form of a parameter file, i.e. a list of test parameters and the values each one of them may have for the currently generated test case. These parameters may determine the contents of the generated test cases in a great detail. For example, in order to exercise a coprocessor that reads data packets, performs some processing and writes back data, test parameters could control the length of the input data, the input data itself, input data address, where it resides (i.e. in memory or cache, or even in a specific memory/cache location), the bus behavior (i.e. read and write latencies, credit control, retry control, etc.) what kind of processing it would have in the coprocessor, etc.

Generated test cases typically are of one of two types: (1) directed, i.e. aimed at hitting a specific scenario (in which case one or more parameters have a small range of allowed values or even a single allowed value); or (2) random, i.e. the test case is randomly generated with no specific scenario in mind (in which case the parameters have a broad selection of allowed values). It is noted that the same test case generator usually handles both types of test cases, in addition to mixed-cases in between these two. The difference between them actually residing in the associated test specification (i.e. in the parameter file that defines the test).

The term "test scenario" may refer to the low level (e.g., a first packet has a specified length, comes at a specified time, resides in a particular address in memory, etc.; a second packet is of a different specified length, and so on). Alternatively, the term "test scenario" can describe a high level scenario (e.g., many long packets back to back, perform very little processing, do not write any output data, and stop). The term "test scenario" can also refer to any level in between these two. When the scenario is roughly defined (e.g., "long packets" without further specificity), it is sometimes referred to as the "test flavor" rather then "test scenario". The test case generator and the entire verification environment may be designed such that it would be possible to specify the test scenario (in the parameter file) to any desired level of detail.

Using this conventional paradigm, each parameter file holds one test scenario or test flavor. But as logic and circuit designs become more complex, there are more and more scenarios that must be tested. Considering the coprocessor example supra, it is likely required to have tests for which the input data is large for all (or most) packets, other tests for which the input data is small, and yet other tests for which it can have any valid size. It is also preferable to have tests for which the output data is large, small and has an arbitrary size. If there is no clear correlation between input and output data size, it is preferable to test the combinations of these test flavors as well, i.e. to have tests where the input data is large for all (or most) packets and the output data is also large, additional tests where input and output data are both small, as well as tests for the other seven combinations. Moreover, for high quality testing, these combinations can be combined with various settings of bus speed (e.g., slow bus speed for read and write operations, fast bus speed for read operations and slow for write operations, etc.). In addition, additional aspects can be added to these combinations, e.g., virtual or real addresses, data buffers that reside in cache or main memory, etc.

Considering the example supra, one can see that a test scenario may be viewed as a combination of test scenario-dimensions (e.g., input packet length, output data length, bus speed, etc.), where each dimension has some distinct characteristics (e.g., small, large or any valid packet length, etc.). Since tests cases are usually specified using parameter files, and parameters are to be assigned values during test case generation, test scenario-dimension characteristics are actually implemented by applying restrictions to the allowed values of some parameters. Hence, test scenario-dimension characteristics may be viewed as parameter value-categories. The description of the invention infra refers to "scenario-dimensions" and their "value-categories", or simply as dimensions and categories.

For modern logic and circuit designs, trying to reach a substantial portion of the valid combinations of the value-categories of the scenario-dimensions to produce an effective test suite, usually requires a large number or bucket of tests, each of which is aimed to cover a specific combination (i.e. a specific scenario). Naturally, this large test bucket is difficult to maintain. In addition, there is a potential risk of critical combinations being left out (i.e. forgotten or not identified as being important).

A small test bucket having "wide open" parameters for data size, bus speed, etc. is not sufficient since it cannot hit most combinations in a reasonable time frame. Considering the example supra, it may only hit a few combinations (i.e. scenarios), as all input packets are to have the same characteristics in order to hit a scenario, which is difficult to achieve when the parameters are "widely opened". Note also that input packet characteristics are only one portion of a scenario.

One solution is to allow the test case to have different distributions for each parameter. Each parameter comprises a table that holds several distributions, where each distribution has its associated relative weight. The test-generator first chooses a distribution, and then randomly generates the parameter value in accordance with the chosen distribution. For the example described supra, regarding input packet size, one of the distributions will be suited for large packets, another one will be suited for small packets, and another will be suited for any valid size. If each distribution is assigned a weight, e.g., 30%, 30% 40% respectively, then there is a higher probability of having test streams consisting of a few consecutive small packets or a few consecutive large packets. The odds are very low, however, for most of the packets in a test to be either large or small. This is because when a single randomization stage is applied, the distribution is chosen separately for each individual packet.

In another embodiment, the task of generating test case programs (files) is divided into a first randomization stage and a second randomization stage. The first randomization stage selects the scenario and the second randomization stage generates a test case in accordance with the chosen scenario. In an illustrative example, the first stage may decide to generate (for all or most packets) large input data, small output data, slow bus response for read operations, fast bus response for write operations, virtual addresses for read operations, real addresses for write operations, read data resides in main memory, write data directed to cache, etc.

Figure 2:
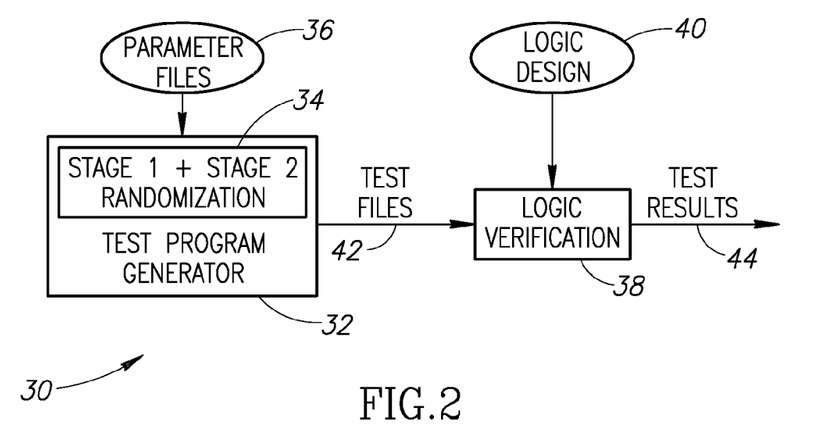
FIG. 2 is a block diagram illustrating a first example test generation mechanism constructed in accordance with the present invention.

In an example embodiment, the first randomization stage as well as the second randomization stage are implemented in the test case generator. A block diagram illustrating a first example test generation mechanism constructed in accordance with the present invention is shown in FIG. 2. The test generation mechanism, generally referenced 30, comprises a test program generator 32. including first stage randomization and second stage randomization block 34, parameters files 36, logic verification block 38 and logic design input 40.

In this embodiment, the test case generator is provided with information (definitions) 36 about the meaning of each category of each dimension along with the relative weight of each category of each dimension. The test case generator outputs test files operative to generate test results 44. A disadvantage of this embodiment, however, is that it increases the complexity of the test case generator which is already typically the most complex environment component.

Figure 3:
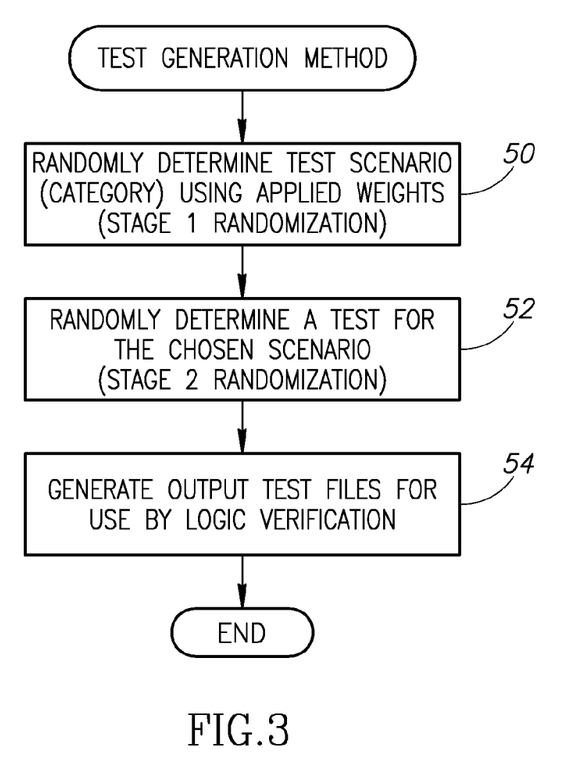
FIG. 3 is a flow illustrating an example method for implementing the test generation mechanism of the present invention.

A flow illustrating an example method for implementing the test generation mechanism of the present invention is shown in FIG. 3. During stage 1, a test scenario (i.e. value-categories) is randomly determined (using the weights assigned to the value-categories within each scenario-dimension (step 50). In stage 2, a test is randomly generated for the chosen scenario (step 52). In other words, for each scenario-dimension, a value is generated randomly for the chosen value-category. Once the values for the value-categories are generated, an output test file for use by the logic verification is generated (step 54).

It is noted that the category selections in the first randomization stage affect all the values chosen for their respective dimensions throughout the entire test (i.e. the second stage). All (or most) items in the test have the same characteristics (i.e. all packets, transactions, commands, etc. have certain qualities). All the values chosen for a certain dimension are within the range of values defined for the category chosen for that dimension.

It is noted that the illustrative example presented supra represents a unique scenario, one that produces severe long lasting starvation conditions for the read side of the coprocessor. Other scenarios (with other value-categories chosen for the various dimensions of the scenario) may produce other kinds of stressing. All of these scenarios could be defined in one or a few test case file(s), in which the weights for the various value-categories are specified for each scenario-dimension.

For example, for the input data size, a weight of 30% can be assigned to the "large" category, 30% to the "small" category, and 40% for category representing any value. The value-categories for all scenario-dimensions are evaluated only once for the entire test case, during the first randomization stage. The selected categories make up the scenario. During the second randomization stage, a test case is generated, in accordance with the scenario chosen in the first randomization stage. For example, if the input data size is selected to be large (during the first randomization stage), only large data sizes will be generated (during the second randomization stage), etc.

Figure 4:
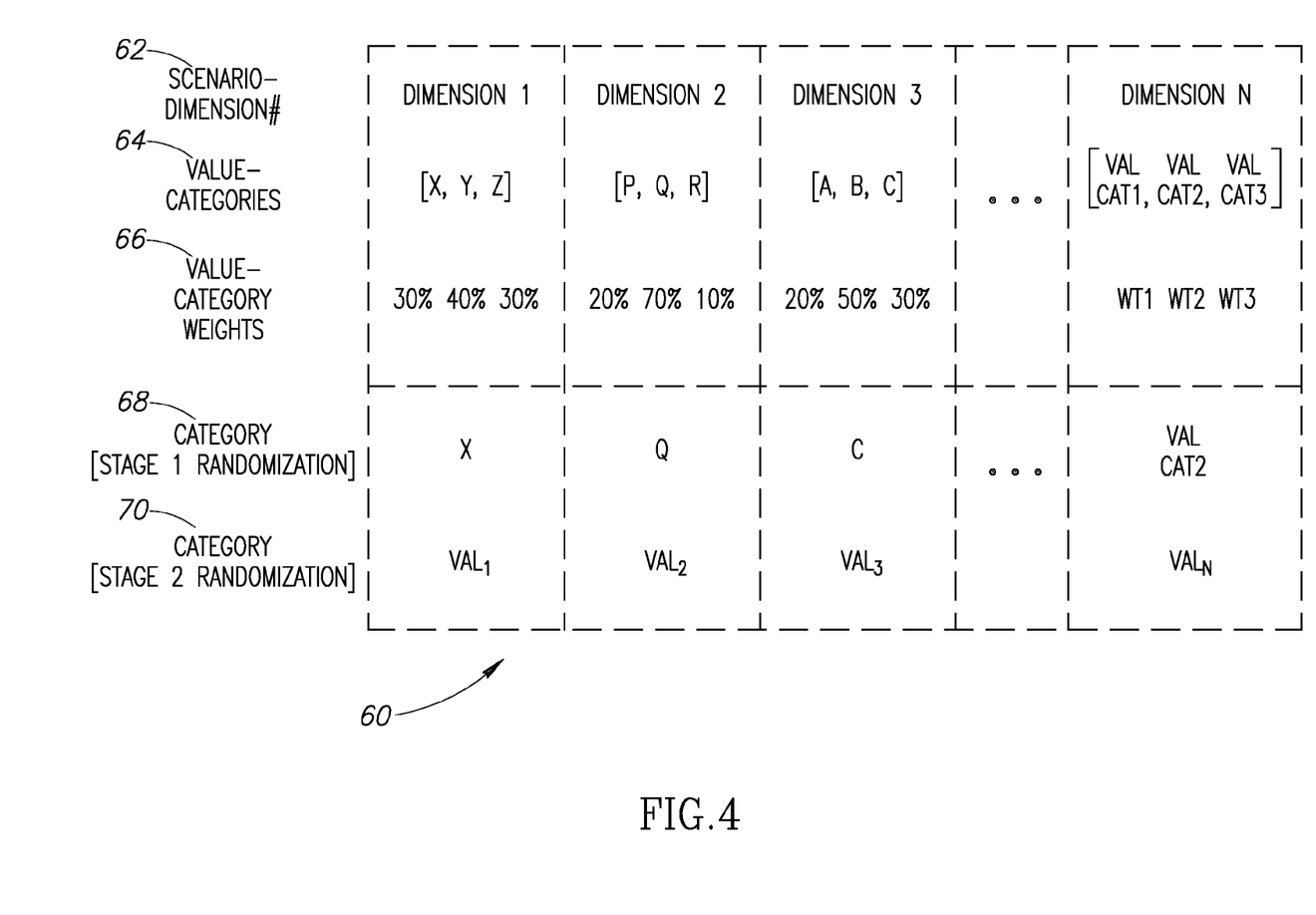
FIG. 4 is a diagram illustrating an example scenario including dimensions, categories and values in accordance with the present invention.

A diagram illustrating an example scenario including dimensions, categories and values in accordance with the present invention is shown in FIG. 4. The scenario, generally referenced 60, comprises a plurality of dimensions 62 (Dimension 1 through N). Each dimension comprises several value-categories 64. For example, Dimension 1 comprises value-categories [x, y, z]; Dimension 2 has value-categories [P, Q, R]; Dimension 3 has value-categories [a, b, c]; and Dimension N has value-categories [val-cat1, val-cat2, val-cat3].

In the first stage randomization of the present invention, the value-categories for each dimension are randomly selected using the value-category weights 66 assigned to each value-category in each dimension. For example, the value-categories selected 68 are x, Q, c and val-cat2 for Dimensions 1, 2, 3 and N, respectively.

In the second stage randomization of the present invention, values for the chosen value-categories are randomly generated. For example, the values generated are x=val1, Q=val2, c=val3 and val-cat2=valN for Dimensions 1, 2, 3 and N, respectively.

Considering that most items have the same characteristics, for dimension 1, for example, all chosen values are of category X, etc. This makes the scenario sensitive to certain possible design faults.

Figure 5:
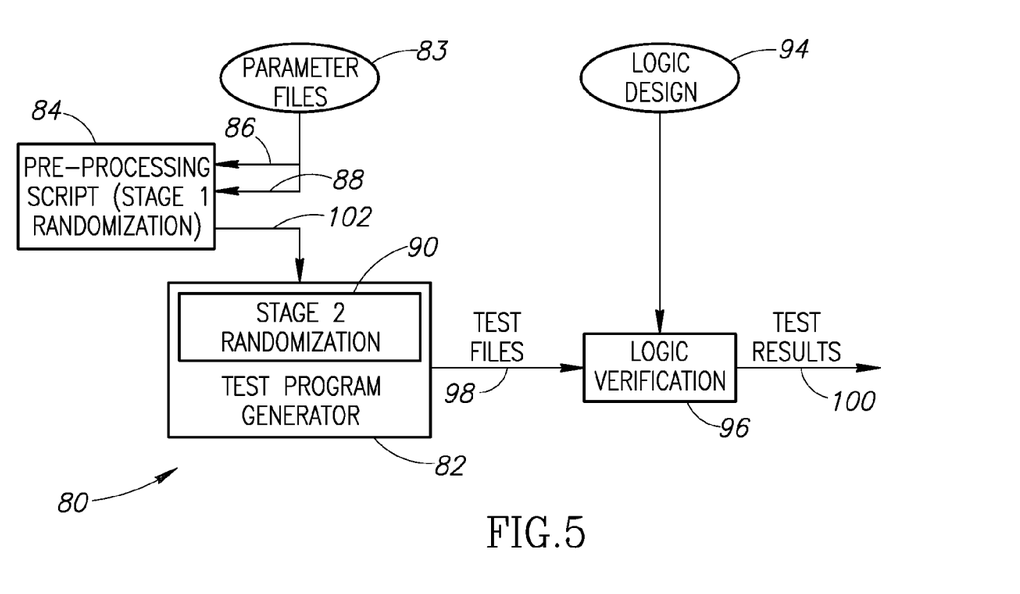
FIG. 5 is a block diagram illustrating a second example test generation mechanism constructed in accordance with the present invention.

A block diagram illustrating a second example test generation mechanism constructed in accordance with the present invention is shown in FIG. 5. The test generation mechanism, generally referenced 80, comprises a test program generator 82 comprising a stage 2 randomization block 90, pre-processing script (stage 1 randomization) 84, parameter files 82, logic verification block 96 and logic design input 94.

Figure 6:
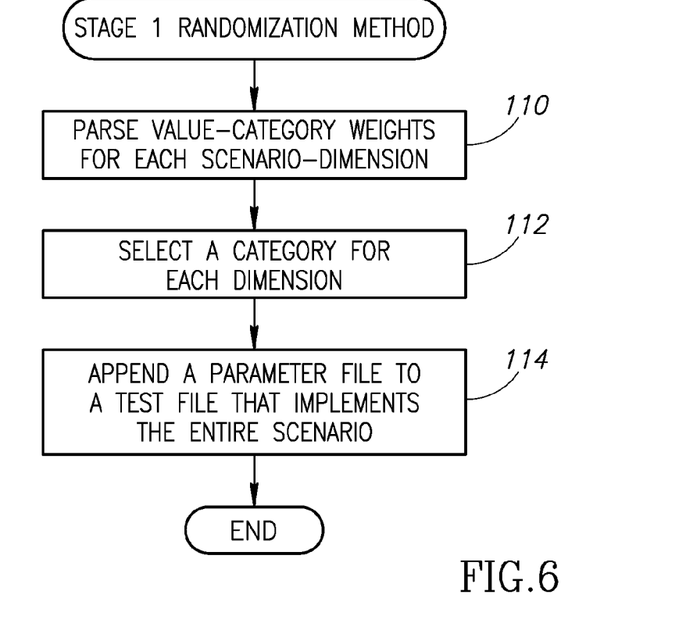
FIG. 6 is a flow diagram illustrating an example stage 1 randomization method.

In this embodiment, the first randomization stage is carried out using the pre-processing script 84 (invoked prior to test generation). A flow diagram illustrating an example stage 1 randomization method is shown in FIG. 6. The script first parses the value-category weights 86 for each scenario-dimension from the input parameter files 83 (step 110). Then, a category for each dimension is chosen in accordance with the parsed value-category weights (step 112). A small parameter file 88 representing the particular category is appended to a test file that implements the entire chosen scenario (step 114).

In the example supra, a small parameter file contains the large input data size. This parameter file includes all the parameters relevant to input data size, each of which having a range of values suitable for large input size. Similarly, another parameter file contains small input packets. Another parameter file contains all valid input data sizes. During the first stage randomization, one of these parameter files is selected based on the weight assigned to each value-category and appended to the script-generated test file.

The value-category selection is performed for each scenario-dimension resulting in a test file 102 that implements a scenario (i.e. each scenario-dimension having specific characteristics, defined by its chosen value-category). The script generated test file 102 is then applied to the test case generator 82. The test case generator may choose different actual parameter values for different packets, but all parameter values chosen obey the overall scenario, i.e. all parameter values chosen for each dimension (e.g., when dealing with multiple packets, for all packets) meet the range of values as defined for the category chosen for that dimension. The test case file 98 output of the test generator is applied, along with the logic design 94, to the logic verification block 96.

One advantage of this embodiment is that the test case generator is relatively simple, for it only has to work with simple parameters. Another advantage is that related parameters can be easily gathered in the parameter file of each category and have related values. For example, if in order to control the bus speed, it is needed to control the number of available credits, the bus delay, the probability of retry, etc., these parameters having appropriate value ranges are placed in the file that implements slow bus operations. These parameters, with other value ranges, are placed in the file that implements fast bus operations. In addition, the process is relatively flexible, since actions are carried out in parameter files without the need for any compilation.

In an alternative embodiment, a weighted-include feature for parameter files is provided and evaluated once per test. Using this embodiment, the various parameter files that correspond to the value-categories of each scenario-dimension, are weighted per the desired weights. One such parameter file is included for each scenario-dimension using the weighted-include facility. The advantages of this embodiment are similar to those of the embodiment described supra.

In another alternative embodiment, test generation is divided between several components (e.g., for a multi-core system). In this embodiment, each component is initially informed of the pre-chosen scenario. They then generate their individual tests accordingly. An example scenario for this embodiment may comprise the following scenario-dimensions: transaction-type, transaction-size, transactions-destination and transaction-rate.

The value-categories for transaction-type could be: mostly Read, mostly Write, mostly read modify write (RMW), or mixed. The value-categories for transaction-size could be: small, medium, large and mixed. The value-categories for transaction-destination could be: most transactions go to Slave1, most transactions go to Slave2, etc., most transactions go to a certain address range in memory, or transactions go to mixed destinations. The value-categories for transaction-rate could be: (nearly) highest possible, high, medium, low or mixed.

This produces stress tests of various kinds in a simple and easy to maintain manner. In addition, it transforms in a very cost effective way a conventional test case generator into a very powerful stress test generator.

In another embodiment, consider a list of scenarios written to a file (i.e. each scenario in this list is comprised of one category for each dimension), with a weight associated with each scenario. At the first randomization stage a scenario is selected from the list (rather then generating it dimension by dimension), and the scenario is applied to the second stage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of generating stress tests for logic verification, said method comprising:
    randomly selecting a category to be tested for each dimension in an input template, wherein the category is randomly selected based on a weight associated with the category, the category indicating a test flavor corresponding to logic or a verification environment; and
    randomly generating one or more values for each selected category.

2. The method according to claim 1, wherein the stress tests comprise a test scenario that comprises a plurality of dimensions.

3. The method according to claim 2, wherein each said dimension comprises a plurality of categories.

4. The method according to claim 1, further comprising generating a test case file based on said generated values.

5. A method of generating a stress test for logic verification, said method comprising:
    randomly selecting a value-category to be tested for each scenario-dimension, wherein the value-category is randomly selected based on a weight associated with the value-category, the value-category indicating a test flavor corresponding to logic or a verification environment and the test flavor representing a low level scenario, a high level scenario, or a combination of the low level scenario and the high level scenario;
    obtaining one or more parameter files, each parameter file incorporating a selected value-category; and
    generating one or more random values for each value-category in accordance with its corresponding parameter file.

6. The method according to claim 5, wherein generating one or more parameter files comprises using a pre-processing script, adapted to be executed on a computer and operative to:
    parse value-category weights for each scenario-dimension in an input template file;
    choose a value-category for each dimension in accordance with a corresponding value-category weight; and
    append a parameter file representing each chosen category to an input test file that implements an entire scenario.

7. The method according to claim 5, wherein generating one or more random values for each value-category is performed by a test case generator.

8. The method according to claim 5, wherein said scenario comprises a plurality of dimensions.

9. The method according to claim 8, wherein each said dimension comprises a plurality of value-categories.

10. The method according to claim 5, further comprising generating a test case file based on said input test file.

11. The method according to claim 5, wherein a value-category is randomly selected taking into account weights associated with each value-category.

12. A method of generating a stress test for logic verification, said method comprising:
    receiving a plurality of parameter files;

weighting, in accordance with weights, said plurality of parameter files corresponding to value-categories to be tested for each scenario-dimension, the value-categories indicating a test flavor corresponding to logic or a verification environment;

selecting one of said plurality of parameter files for each scenario-dimension; and generating a random value for a parameter in the scenario-dimension based on the selected parameter file.

13. The method according to claim 12, wherein generating one or more random values for each value-category is performed by a test case generator.

14. The method according to claim 13, wherein each selected parameter file is provided to said test case generator utilizing a weighted-include facility.

15. The method according to claim 12, wherein said scenario comprises a plurality of dimensions.

16. The method according to claim 15, wherein the test flavor corresponds to a transaction and the test flavor indicates a transaction-type, a transaction-size, a transaction-destination, and/or a transaction-rate.

17. An apparatus for generating a stress test for logic verification, comprising:

a receiver unit operative to receive value-category definitions for each scenario-dimension;

a first randomization stage operative to select a value-category to be tested randomly for each scenario-dimension, wherein the value-category is randomly selected based on a weight associated with the value-category, the value-category indicating a test flavor corresponding to logic or a verification environment; and a second randomization stage operative to generate a value randomly for each value-category.

18. The apparatus according to claim 17, further comprising generating test case files in accordance with said generated values.

19. The apparatus according to claim 17, wherein said scenario comprises a plurality of dimensions.

20. The apparatus according to claim 19, wherein each said dimension comprises a plurality of value-categories.

21. The apparatus according to claim 19, wherein a value-category is randomly selected taking into account weights associated with each value-category.

22. The apparatus according to claim 19, further comprising a file generator operative to generate a test case file based on said generated value-category values.

* * * * *